United States Patent [19]

Ichikawa

[11] Patent Number: 4,912,322
[45] Date of Patent: Mar. 27, 1990

[54] OPTICAL TYPE DISPLACEMENT DETECTING DEVICE

[75] Inventor: Souji Ichikawa, Sagamihara, Japan

[73] Assignee: Mitutoyo Mfg. Co., Ltd., Tokyo, Japan

[21] Appl. No.: 82,593

[22] Filed: Aug. 7, 1987

[30] Foreign Application Priority Data

| Aug. 15, 1986 | [JP] | Japan | 61-191532 |
| Aug. 20, 1986 | [JP] | Japan | 61-194183 |
| Aug. 20, 1986 | [JP] | Japan | 61-194184 |
| Sep. 4, 1986 | [JP] | Japan | 61-208554 |
| Sep. 4, 1986 | [JP] | Japan | 61-208555 |

[51] Int. Cl.$^4$ .......... G01D 5/34; G01B 11/14
[52] U.S. Cl. .......... 250/237 G; 250/231.13; 356/373; 341/13
[58] Field of Search .......... 250/237 G, 231 SE; 356/395, 373, 374; 340/347 P, 671

[56] References Cited

U.S. PATENT DOCUMENTS

| 3,768,911 | 10/1973 | Erickson | 250/237 G |
| 3,812,352 | 5/1974 | MacGovern | 250/237 G |
| 4,049,965 | 9/1977 | Pettigrew | 250/237 G |
| 4,051,367 | 9/1977 | Sayce, deceased et al. | 250/237 G |
| 4,176,276 | 11/1979 | Kaul et al. | 356/395 |
| 4,218,615 | 8/1980 | Zinn, Jr. | 250/231 SE |
| 4,375,592 | 3/1983 | Cox et al. | 250/231 SE |
| 4,461,083 | 7/1984 | Ernst | 250/237 G |
| 4,519,709 | 5/1985 | Nelle | 250/237 G |
| 4,606,642 | 8/1986 | Nelle | 250/237 G |

FOREIGN PATENT DOCUMENTS

| 1063060 | 3/1967 | United Kingdom . |
| 1504691 | 3/1978 | United Kingdom . |
| 2024416 | 1/1980 | United Kingdom . |
| 2095399 | 9/1982 | United Kingdom . |

Primary Examiner—David C. Nelms
Assistant Examiner—Michael Messinger
Attorney, Agent, or Firm—Parkhurst, Oliff & Berridge

[57] ABSTRACT

An optical type displacement detecting device including a main scale and an index scale, wherein a pitch of a first optical grating formed on the main scale is set at P and a pitch of a second optical grating formed on the index scale is set at P/n, thereby producing divided detection signal having pitch P/n. Furthermore, the pitch of the second optical grating is set at $(u+v)P/u$ or $(u+v)P/(2u)$ (u is a gap between a diffusive light source and the first optical grating and v is a gap between the first and second optical gratings), so that a collimator lens can be dispensed with. Further, higher harmonic components of the first optical grating are utilized, whereby the pitch of the second optical grating is set at substantially $(u+v)Q/u$ or $(u+v)Q/(2u)$ (Q=P/m, and m is a whole number of 2 or more), thereby preventing the pitch of the second optical grating from being divided into small ones.

22 Claims, 12 Drawing Sheets $q = P / 2 (n=2)$ $q \neq P / 2 (n \neq 2)$

OPTICAL TYPE DISPLACEMENT DETECTING DEVICE

BACKGROUND OF THE INVENTION

1. Field of the Invention

This invention relates to optical type displacement detecting devices and more particularly to improvements in an optical type displacement detecting device, wherein a positional relationship between two members is detected from a change of a photoelectrically transduced signal produced by a relative displacement between a main scale formed thereon with an optical grating and an index scale formed thereon with an optical grating corresponding to that of the main scale.

2. Description of the Prior Art

To measure a feed value of a tool of a tool machine and the like in the field of tool machines and measuring instruments, as shown in FIG. 15, there has heretofore been popularized such an optical type displacement detecting device that a main scale 14 formed thereon with a first optical grating (hereinafter referred to as the "first grating") 16 is fixed to one of members movable relative to each other, and a slider having an index scale 18 formed thereon with a second optical grating (hereinafter referred to as the "second grating") 20, illuminating means constituted by a light source 10 and a collimator lens 12 for example, and photoelectric transducing means constituted by light receiving elements 22 for example are fixed to the other member, whereby a change in quantity of light produced by a relative movement between the first grating 16 and the second grating 20 is photo-electrically transduced and detection signals thus detected are interpolated and converted into pulses and counted by an attached counter circuit, so that a displacement value can be measured.

In the above-described detecting device, for example, the second grating 20 formed on the index scale 18 is divided into four including phases 0°, 90°, 180° and 270° as shown in FIG. 15, and a change in quantity of light is differentially amplified by preamplifiers 24A and 24B, whereby detection signals of two phases which can be substantially approximated by $A \sin \theta$ and $A \cos \theta$ corresponding to a displacement in the direction x of the index scale 18.

In the above-described detecting device, along with advanced finishing techniques, necessity has been voiced for dividing the measuring resolution further smaller. However, there is a limit imposed on the number of interpolation of the detection signal in the counter circuit, and further there is a possibility of errors caused by the interpolation, whereby to further make smaller a pitch of the detection signal itself is demanded, so that a grating pitch P of the first grating 16 of the main scale 14 tends to be decreased. Heretofore, the grating pitch P has been set at about 20 micrometer, however, recently, a specification of 10 micrometer or less is on demand.

However, the following disadvantages have been presented along with reduction of the grating pitch P of the first grating 16 of the main scale 14.

More specifically, from the viewpoint of design of mechanism, it is necessary that an absolute value of a gap g between the main scale 14 and the index scale 18 and an allowable variation thereof should be set at some values or more. However, in order to meet the requirements when the grating pitch P is small in value, it is necessary to use the collimator lens 12 having high accuracy and a long focal length, for making illuminating light to be satisfactorily parallel rays. As a consequence, the detecting device tends to be large-sized.

On the other hand, as a detecting device wherein the gap g can be increased without using the collimator lens 12 with high accuracy, British patent application No. 44522/74 has been proposed. However, in this prior art, such a disadvantage is presented that the detecting device is difficult to be applied to the transmission type detecting device in particular, because three optical gratings are needed.

Furthermore, there is a disadvantage of grating pitch of the second grating 20 formed on the index scale 18 and dividing the phase thereof. More specifically, the second grating 20 is divided into four in the example of FIG. 15. However, in study of the accuracy of a deviation δ of vertical dividing, when the grating pitch of the first grating 16 is 8 micrometer, if the grating pitch of the second grating 20 is also 8 micrometer, then, in order to obtain the accuracy of 90° plus or minus 10° as a phase difference of the detection signals, it is necessary to use a very small grating pitch and set the deviation δ at (2 plus or minus 0.2) micrometer. As a consequence, advanced finishing techniques are needed and the yield of the index scale 18 in the manufacturing is deteriorated, thus resulting in increased cost.

On the other hand, as another detecting device advantageous in rendering the device with high resolving-power, there is proposed a detecting device for making so-called optical division, wherein a pitch t of a detection signal obtained against the pitch P of the first grating formed on the main scale is one obtained by making the pitch P smaller, such for example as P/2.

In the aforesaid British patent application No. 44522/74 for example, there is disclosed a detecting device wherein the three optical gratings are used to produce a detection signal having a ½ pitch of the grating pitch P of the main scale. However, the disadvantage is presented that the prior art is difficult to be applied to the transmission type detecting device as aforesaid.

Furthermore, in British patent application No. 2024416A, as shown in FIG. 16, there is proposed a detecting device, wherein the ratio between a light transmitting portion 16A and a light shielding portion 16B of the first grating 16 formed on the main scale 14 is set at 1: $(2n-1)$, whereby the pitch t of a detection signal obtained by the light receiving elements (photodiodes) 22 through the index scale 18 formed thereon with the second grating 20 is 1/n of the pitch P of the first grating 16.

In the detecting device shown in FIG. 16, the ratio between the light transmitting portion 16A of the first grating 16 and the grating pitch P thereof is set at 1:4, a pitch q of the second grating 20 is set at P/2, and a pitch t of a detection signal obtained by amplifying signals from the photodiode 22 by the preamplifier 24 is q, i.e., ½ of the pitch P of the first grating.

By use of the detecting device shown in FIG. 16, a detection signal of the pitch t obtained by dividing the pitch P of the first grating 16 can be positively obtained. However, since it is necessary to make shorter the length of the light transmitting portion 16A of the first grating 16 in proportion to the number of division, this is substantially equal to that the grating pitch is further made smaller, and particularly, from the viewpoint of the finishing techniques, it becomes difficult to manufacture the first grating 16 formed on the main scale 14 having the long measuring range originally. Furthermore, since the satisfactory parallel rays are needed, a collimator lens having high accuracy and a long focal length is required, thus resulting in a large-sized detecting device. Further, against the grating pitch P of the main scale, the grating pitch of the index scale is P/2, and, such a disadvantage is presented that, when the pitch P is 10 micrometer or less for example, the yield of the index scale in manufacturing is low, thus resulting in increased cost.

On the other hand, in the aforesaid British patent application No. 2024416A, further, there is described an example wherein, even when the ratio between the lengths of the light transmitting portion 16A and the light shielding portion 16B of the first grating 16 is 1:1, optical division can be performed. However, in this prior art, when an effective wavelength of an optical system is set at λ and the pitch of the first grating 16 is set at P, the grating gap v needs to satisfy a relationship of the following formula (1), thus presenting such a disadvantage that a mechanism section for holding the grating gap v at a predetermined value becomes complicated.

$$v \lesssim (P^2/\lambda)/2 \tag{1}$$

SUMMARY OF THE INVENTION

The present invention has been developed to obviate the above-described disadvantages of the prior art and has as its first object the provision of an optical type displacement detecting device wherein, even when the ratio between a light transmitting portion and a light shielding portion of a first grating formed on a main scale is 1:1, the optical dividing is possible, and moreover, even if a gap between the gratings formed on the main scale and an index scale is a predetermined value or more, a relatively satisfactory detection signal can be obtained.

To achieve the above-described first object, a first aspect of the present invention contemplates in the optical type displacement detecting device comprising:

illuminating means including a coherent light source:

the main scale formed thereon with the first grating having a grating pitch P;

the index scale formed thereon with a second grating having a grating pitch q=P/n (n is a whole number of 2 or more); and a light receiving element for photoelectrically transducing illuminating light transmitted through the first and second gratings; wherein a detection signal having a pitch P/n is produced in accordance with a relative displacement between the main scale and the index scale.

In a specific form of the first aspect of the present invention, a gap between the first and the second gratings is set at substantially $mq^2/\lambda$ (m is a whole number of 1 or more), when a center wavelength of effective spectra of an optical system in consideration of the light receiving element is set at λ.

In another specific form of the first aspect of the present invention, the grating pitch q of the second grating is set at P/2 and a gap between the first and second gratings is set at substantially $2q^2/\lambda$ or more, when a center wave-length of effective spectra of an optical system in consideration of the light receiving element is set at λ.

In a further specific form of the first aspect of the present invention, the light source is a laser diode.

In a still further specific form of the first aspect of the present invention, the ratio between the light transmitting or reflecting portion and the light shielding or absorbing portion of the first grating is set at substantially 1:1.

In a still more further specific form of the first aspect of the present invention, the ratio between the light transmitting portion and the light shielding portion of the second grating is set at substantially 1:1.

In the optical type displacement detecting device, in general cases where distributions of the transmission factors or the reflection factors of illuminating light by the first grating cannot be represented by simple sine functions, it is difficult to accurately analyze changes of the illustrating light transmitted through the first grating, and hence, the inventor of the present application observed the states of detection signals, while constructing the detecting devices for the various cases.

The first aspect of the present invention has been invented on the basis of the results of the above-described observations. The grating pitch of the grating is set at P, the grating pitch of the second grating is set at P/n (n is a whole number of 2 or more), these first and second gratings are illuminated by a coherent light source, and a detection signal having a pitch P/n is adapted to be produced in accordance with a relative displacement between the main scale and the index scale. As a consequence, even when the ratio between the light transmitting or reflecting portion and the light shielding or absorbing portion of the first grating formed on the main scale is set at substantially 1:1, the optical division becomes possible, thus facilitating the manufacture of the main scales. Furthermore, even when the grating gap formed between the gratings formed on the main scale and the index scale is set at a predetermined value or more, a relatively satisfactory detection signal can be obtained, so that the grating gap can be set wider, thus facilitating the construction of the mechanism section.

The present invention has as its second object the provision of an optical type displacement detecting device, wherein there is no need of using a collimator lens having high accuracy and a long focal length and an index scale can be easily finished.

To achieve the above-described second object, a second aspect of the present invention contemplates in an optical type displacement detecting device comprising:

a diffusive light source for illuminating a main scale without using a collimator lens;

the main scale located at a position spaced apart a gap u from the diffusive light source and formed thereon with a first grating having a grating pitch P;

an index scale located at a position spaced apart a gap v from the first grating and formed thereon with a second grating having a grating pitch q=(u+v) P/u; and a light receiving element for photoelectrically transducing a change in quantity of light due to overlapping of an image of the first grating by the diffusive light source with the second grating when the both scales move relative to each other.

In a specific form of the second aspect of the present invention, the diffusive light source is a point light source.

In another specific form of the second aspect of the present invention, the point light source is a laser diode.

In a further specific form of the second aspect of the present invention, the point light source is formed such that a lens for controlling a diverging angle such for example as a hemispherical lens is provided in front of a light emitting portion of a laser diode.

In a still further specific form of the third aspect of the present invention, the diffusive light source is a linear light source orientated in the direction of grating width of the first grating.

In a still more further specific form of the third aspect of the present invention, the gap v is set at $$v \simeq un\ P^2/(\lambda u - nP^2)$$

(n is a natural number of $\lambda u/P^2$ or less), when a wavelength at a mean value of light sensitivity spectra of an optical system is set at $\lambda$.

The present invention has as its third object in addition to the second object the provision of an optical type displacement detecting device, wherein optically dividing into two can be performed by use of two gratings.

To achieve the above-described third object, a third aspect of the present invention contemplates in the optical type displacement detecting device comprising:

a diffusive light source for illuminating a main scale without using a collimator lens;

the main scale located at a position spaced apart a gap u from the diffusive light source and formed thereon with a first grating having a grating pitch P:

an index scale located at a position spaced apart a gap v from the first grating and formed thereon with a second grating having a grating pitch $q=(u+v)\ P/(2u)$; and a light receiving element for photoelectrically transducing a change in quantity of light due to overlapping of an image of the first grating by the diffusive light source with the second grating when the both scales move relative to each other.

In a specific form of the third aspect of the present invention, the diffusive light source is a point light source.

In another specific form of the third aspect of the present invention, the point light source is a laser diode.

In a further specific form of the third aspect of the present invention, the point light source is formed such that a lens for controlling a diverging angle such for example as a hemispherical lens is provided in front of a light emitting portion of a laser diode.

In a still further specific form of the third aspect of the present invention, the diffusive light source is a linear light source orientated in the direction of width of the first grating.

In a still more further specific form of the third aspect of the present invention, the gap v is set at $$v = u\ (n-0.5)\ P^2/\{\lambda u - (n-0.5)\ P^2\}$$

(n is a natural number of $\lambda u/P^2 + 0.5$ or less), when a wavelength at a mean value of light sensitivity spectra of an optical system is set at $\lambda$.

The principle of detection of the second and third aspects of the present invention will hereunder be described.

As shown in FIG. 1, a diffusive light source 30 (a point light source, for example) is disposed in front of a first grating 16 spaced apart a gap u from the first grating 16 having a grating pitch P. Then, an image of the enlarged first grating 16 is seemingly formed on a screen S spaced apart a gap v from the first grating 16. However, in actuality, the shape of the image widely varies due to the effects of diffraction.

For the sake of simplification, an amplitude transmission factor f (x) of light of the first grating 16 is represented by the following equation (2), and the result of calculation of an image distrubution g (x) on the screen S at the gap v according to the theory of Fresnel diffraction described in page 383 of "Principles of Optics, 6th edition" (MAX BORN & EMIL WOLF, Pergamon Press 1980) will be shown below.

$$f(x) - 1 + cos\ (2\pi x/P) \tag{2}$$

Here, a wavelength at a mean value of light spectra in this optical system in consideration of light emitting spectra of the diffusive light source 30 and a wavelength sensitivity of the light receiving element is set at $\lambda$ and n is made to be a natural number (a whole number of 1 or more).

First, when the gap v is substantially equal to v1 (n) represented by the following equation (3), a relationship shown in the following formula (4) is established except for a proportionality factor.

$$\begin{aligned} v &\simeq v1\ (n) \\ &= u\ (n-0.5)\ P^2/\{\lambda u - (n-0.5)\ P^2\} \end{aligned} \tag{3}$$

$$\begin{aligned} g(x) &= g1(x) \\ &\simeq 4 + \cos[4\pi ux/\{(u+v)\ P\}] \end{aligned} \tag{4}$$

On the other hand, when the gap v is substantially equal to v2 (n) represented by the following formula (5), a relationship shown in the following formula (6) is established except for a proportionality factor.

$$\begin{aligned} v &\simeq v2\ (n) \\ &= un\ P^2/(\lambda u - nP^2) \end{aligned} \tag{5}$$

$$\begin{aligned} g(x) &= g2(x) \\ &\simeq 1 + \cos[2\pi ux/\{(u+v)\ P\}] \end{aligned} \tag{6}$$

It is found from the formula (3) and (4) that, by providing a second grating having a grating pitch $q=(u+v)\ P/(2u)$ on the screen S where the gap v is close to v1 (n), a detection signal can be obtained. This image has a grating pitch of $\frac{1}{2}$ to the seeming image, and has such notable characteristics that, when the first grating 16 is displaced by one pitch P, the detection signal is varied by two pitches.

On the other hand, it is found from the formula (5) and (6) that, by providing the second grating having the grating pitch $q=(u+v)\ P/u$ on the screen S where the gap v is close to v2 (n), a detection signal can be obtained. Since this image is commensurate to the seeming image, the detection signal is varied by one pitch when the first grating 16 is displaced by one pitch P.

The detecting device according to the present invention has not heretofore been deeply studied because there has not been, as a diffusive light source 30 and particularly as a point light source, one having a small light emitting portion and yet having a high output and necessity for the aforesaid detecting device has been low when the grating pitch P is large. Now, due to changes in the technical background such as the cost of a laser diode which is ideal as a point light source is decreased and as necessity of overcoming the problems when the grating pitch P comes to be very small, the inventor of the present invention, having made study on the problems, has introduced the aforesaid formula (4) and (6) and ascertained the practicability of the above-described detecting device.

The second aspect of the present invention has been based on the result of the above-described study. The grating pitch of the first grating is set at P and the grating pitch q of the second grating is set at (u+v) P/u (u is a gap between the diffusive light source and the first grating, and v is a gap between the first and second gratings), and the main scale formed thereon with the first grating is illuminated by the diffusive light source without using the collimator lens, whereby a change in quantity of light due to overlapping of an image of the first grating with the second grating is photo-electrically transduced. Consequently, a point light source or a linear light source as it is can be used as the diffusive light source and there is no need of using a collimator lens having high accuracy and a long focal length. Furthermore, the pitch of the index scale can be made larger than that in the past, so that the manufacture and finishing of the index scales can be facilitated.

The third aspect of the present invention also has been based on the result of the above-described study. The grating pitch of the first grating is set at P and the grating pitch q of the second grating is set at (u+v) P/(2u), and the main scale formed thereon with the first grating is illuminated by the diffusive light source without using the collimator lens, whereby a change in quantity of light due to overlapping of an image of the first grating with the second grating is photoelectrically transduced. As a consequence, the optical division into two can be further achieved by use of the two gratings.

Incidentally, when according to the first aspect of the present invention, the pitch of the first grating on the main scale was set at P and the pitch of the second grating on the index scale was set at P/n (n is a whole number of 2 or more) and a detection signal of the pitch P/n was obtained, the ratio between the light transmitting or reflecting portion and the light shielding portion was set at 1:1. However, the first grating had higher harmonic components of a pitch P/n in addition to a fundamental harmonic component of the pitch P, and hence, it is presumed that a detection signal was obtained due to overlapping of images of the higher harmonic components with the second grating. This is substantiated by the fact that, when the wavelength is set at $\lambda$, a signal having a good contrast can be obtained about at a position where the grating gap is obtained by multiplying $(P/n)^2/\lambda$ by a certain whole number.

Assumption is made that there is a grating F1 (x) having a pitch P and the ratio between the light transmitting or reflecting portion and the light shielding portion is set at 1:1 accurately as the first grating, for example, and, if this is Fourier-analyzed, then the following equation is obtained, except for a constant.

$$F1(x) = 1/2 + 0.6 \sin(2\pi x / P) +$$
$$0.2 \sin(3 \cdot 2\pi x / P) +$$
$$0.1 \sin(5 \cdot 2\pi x / P) + \ldots$$

As a consequence, it is apparent that F1 (x) includes higher harmonics such as ones of the third order and of the fifth order in addition to the fundamental harmonic.

Similarly, assumption is made that, in the first grating, the ratio between the light transmitting or reflecting portion and the light shielding portion is set at 5:7, and, when Fourier analysis is made, it is introduced that the higher harmonics of the second order and of the fourth order are included.

In general, the first grating is manufactured with the ratio between the light emitting or reflecting portion and the light shielding portion being aimed at 1:1. However, variability occurs as viewed from the manufacturing techniques and the ratio 1:1 is not achieved. In this respect, it is conceivable that there are included the higher harmonics of all orders, and the above-described detecting device utilizes these higher harmonic components.

However, this detecting device needs a collimator lens having high accuracy and a long focal length, for making the illuminating light to be satisfactory parallel rays. Consequently, such an aforesaid disadvantage is presented that the detecting device becomes large-sized.

Further, as the optical division is increased, the pitch of the second grating on the index scale should be divided further smaller. For the index scale, being different from the main scale, it suffices to have several mm, the small pitch does not form a substantial obstruction, however, such a problem remains that as the pitch is divided smaller, the yield is deteriorated in the manufacturing of the index scales.

The same is true of the case where the pitch of the second grating on the index scale is set at P/(2n) and a detection signal of a pitch P/(2n) is to be obtained. In this case, a signal having a good contrast can be obtained mainly at a position where the grating gap is obtained by multiplying $(P/n)^2/\lambda$ by half of a whole number.

Consequently, the present invention has as its fourth object the provision of an optical type detecting device, wherein the optical division can be performed without using a collimator lens having high accuracy and a long focal length and the index scale can be easily manufactured.

To achieve the above-described fourth object, the fourth aspect of the present invention contemplates in the optical type displacement detecting device comprising:
a diffusive light source;
a main scale located at a position spaced apart a gap u from the diffusive light source and formed thereon with a first grating having a grating pitch P and including higher harmonic components;
an index scale located at a position spaced apart a gap v from the first grating and formed thereon with a second grating having a grating pitch $q \simeq (u+v) Q/u$ when $Q = P/m$ (m is a whole number of 2 or more); and
a light receiving element for photoelectrically transducing a change in quantity of light due to overlapping of an image of the first grating by the diffusive light source with the second grating when the both scales move relative to each other, to thereby produce a detection signal of the pitch Q.

In a specific form of the fourth aspect of the present invention, the diffusive light source is a point light source.

In another specific form of the fourth aspect of the present invention, the point light source is a laser diode.

In a further specific form of the fourth aspect of the present invention, the point light source is formed such that a lens for controlling a diverging angle such for example as a hemispherical lens is provided in front of a light emitting portion of a laser diode.

In a still further specific form of the fourth aspect of the present invention, the diffusive light source is a linear light source orientated in the direction of width of the first grating.

In a still more further specific form of the fourth aspect of the present invention, the gap v is set at $$v \simeq nMQ^2/\lambda$$

(n is a whole number of 1 or more), when a wavelength at a mean value of light sensitivity spectra of an optical system is set at $\lambda$, and further, a magnification M of this system is defined by $M \simeq (u+v)/u$.

The present invention has as its fifth object the provision of an optical type displacement detecting device, wherein the optical multiple division can be performed by use of two gratings, in addition to the fourth object.

To achieve the above-described fifth object, a fifth aspect of the present invention contemplates in an optical type displacement detecting device comprising:

a diffusive light source;

a main scale located at a position spaced apart a gap u from the diffusive light source and formed thereon with a first grating having a grating pitch P and including higher harmonic components;

an index scale located at a position spaced apart a gap v from the first grating and formed thereon with a second grating having a grating pitch of $q \simeq (u+v)Q/(2u)$, when $Q=P/m$ (m is a whole number of 2 or more); and a light receiving element for photoelectrically transducing a change in quantity of light due to overlapping of an image of the first grating by the diffusive light source with the second grating when the both scales move relative to each other, to thereby produce a detection signal of a pitch $Q/2$.

In a specific form of the fifth aspect of the present invention, the diffusive light source is a point light source.

In another specific form of the fifth aspect of the present invention, the point light source is a laser diode.

In a further specific form of the fifth aspect of the present invention, the point light source is formed such that a lens for controlling diverging angle such for example as a hemispherical lens is provided in front of a light emitting portion of a laser diode.

In a still further specific form of the fifth aspect of the present invention, the diffusive light source is a linear source orientated in the direction of width of the first grating.

In a still more further specific form of the fifth aspect of the present invention, the gap v is set at $$v \simeq (n-\tfrac{1}{2})MQ^2/\lambda$$

(n is a whole number of 1 or more), when a wavelength at a mean value of light sensitivity spectra of an optical system is set at $\lambda$, and further, a magnification M of this system is defined by $M=(u+v)/u$.

The principles of detection according to the fourth and fifth aspects of the present invention will hereunder be described.

Referring to FIG. 1, when assumption is made that the first grating 16 has higher harmonic components of the order of m (m is a whole number of 2 or more), it is conceivable that instead of the first grating, there is a grating represented by a pitch Q (provided that $Q=P/m$). Then, an image of an enlarged grating of the pitch Q is seemingly formed on a screen S spaced apart the gap v from the first grating 16. However, in actuality, the distribution of light quantity of the image is widely varied in accordance with the values of u and v.

For the sake of simplification, an amplitude transmission factor f (x) of light of the grating of the pitch Q is represented by the following equation (7), and the result of calculation of an image distribution g (x) on the screen S at the gap v according to the aforesaid theory of Fresnel diffraction will be shown below.

$$T(x) = 1 + \cos(2\pi x/Q) \quad (7)$$

Here, a wavelength at mean value of spectra of light in this optical system in consideration of spectra of light emitted by the diffusive light source 30 and wavelength sensitivity of a light receiving element is set at $\lambda$, n is set at a natural number (a whole number of 1 or more), and a magnification M of the first grating is defined by $M=(u+v)/u$.

First, when the gap v is substantially equal to v1 (n) represented by the following equation (8), a relationship shown in the following formula (9) is established except for a proportionality factor.

$$\begin{aligned} v &\simeq v1(n) \\ &= (n-0.5)\, MQ^2/\lambda \end{aligned} \quad (8)$$

$$\begin{aligned} g(x) &\equiv g1(x) \\ &\simeq 4 + \cos[4\pi ux/\{(u+v)Q\}] \end{aligned} \quad (9)$$

The equation (8) is equivalent to the following equation.

$$\begin{aligned} v &\simeq v1(n) \\ &= u(n-0.5)Q^2 \\ &\quad / \{\lambda u - (n-0.5)Q^2\} \end{aligned}$$

However, even if v is varied, g1 (x) is not varied so much. Therefore, the equation (8) is not so strict one.

On the other hand, when the gap v is substantially equal to v2 (n) represented by the following equation (10), a relationship shown in the following formula (11) is established except for a proportionality factor.

$$\begin{aligned} v &\simeq v2(n) \\ &= nMQ^2/\lambda \end{aligned} \quad (10)$$

$$\begin{aligned} g(x) &\equiv g2(x) \\ &\simeq 1 + \cos[2\pi ux/\{(u+v)P\}] \end{aligned} \quad (11)$$

It is found from the formula (8) and (9) that, by providing the second grating having the grating pitch $q=(u+v) P/(2u)$, a detection signal can be obtained on the screen S where the gap v is close to v1 (n). This image has a grating pitch of $\tfrac{1}{2}$ to the seeming image, and has such notable characteristics that, when the first grating 16 is displaced by Q, i.e., P/m, the detection signal is varied by a value commensurate to two pitches.

On the other hand, it is found from the formula (10) and (11) that, by providing the second grating having the grating pitch $q=(u+v)Q/u$, a detection signal can be obtained on the screen S where the gap v is close to v2 (n). Since this image is commensurate to the seeming image, the detection signal is varied by a value commensurate to one pitch when the first grating 16 is displaced by Q, i.e., P/m.

Incidentally, wave formes having various pitches are present on the screen S corresponding to the higher harmonic components of the first grating. However, it is conceivable that the second grating filters specific components therefrom.

The fourth aspect of the present invention has been based on the results of the above-described study. The grating pitch of the first grating is set at P and the grating pitch q of the second grating is set at $(u+v)Q/u$ ($Q=P/m$), the main scale formed thereon with the first grating is illuminated by the diffusive light source, and a change in quantity of light due to overlapping of an image of higher harmonic components of the first grating with the second grating is photo-electrically transduced, to thereby produce a detection signal of the pitch Q. Consequently, the point light source or the linear light source as it is can be used as the diffusive light source, and use of a collimator lens having high accuracy and a long focal length is not needed. Furthermore, the pitch of the second grating can be made larger than that in the past, so that the index scales can be easily manufactured.

The fifth aspect of the present invention has been also based on the results of the above-described study. The grating pitch of the first grating is set at P and the grating pitch q of the second grating is set at $(u+v)Q/(2u)$, and the main scale formed thereon with the first grating is illuminated by the diffusive light source, whereby a change in quantity of light due to overlapping of an image of higher harmonic components of the first grating and the second grating is photoelectrically transduced, to thereby produce a detection signal of a pitch $Q/2$. Consequently, further, the optical multiple division can be achieved by use of the two gratings.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

The embodiments of the present invention will hereunder be described in detail with reference to the accompanying drawings.

Figure 1:
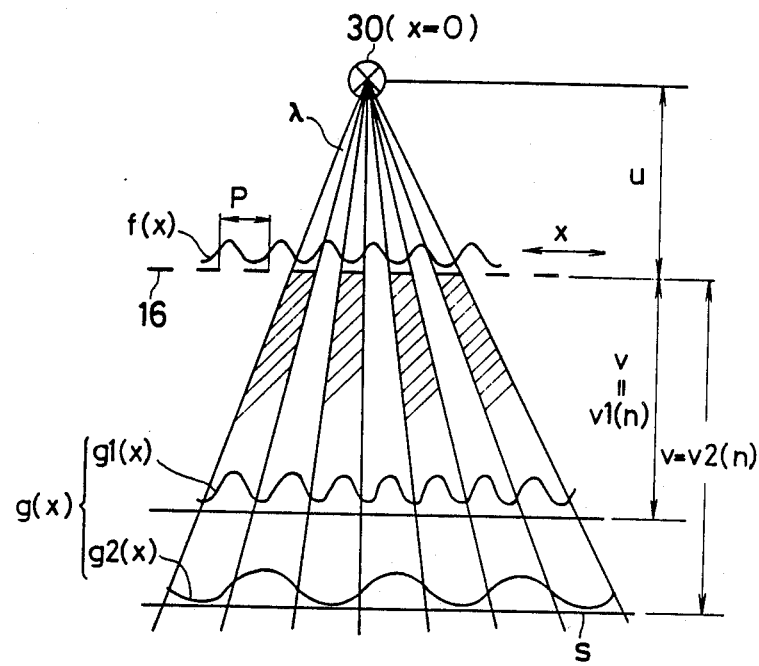
FIG. 1 is a chart in explanation of the principle of detection according to the present invention.
Figure 2:
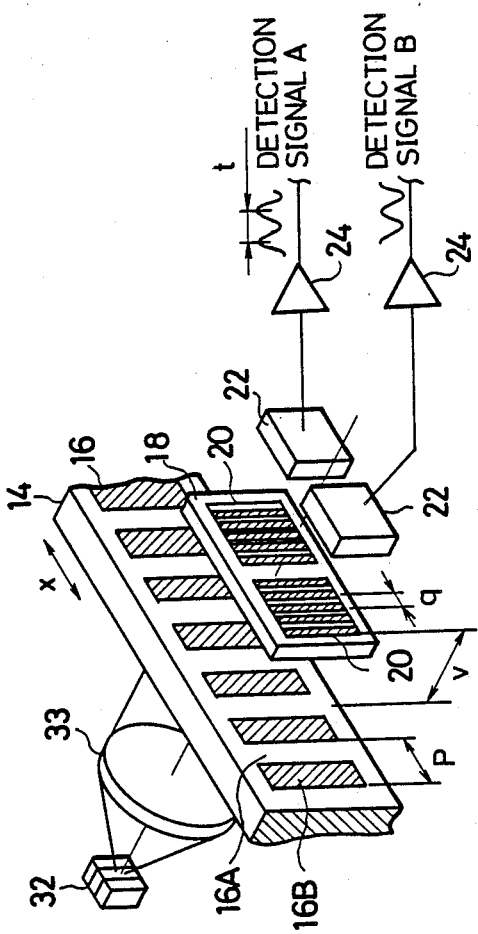
FIG. 2 is a perspective view showing the arrangement of a first embodiment of the optical type displacement detecting device according to the present invention.

As shown in FIG. 2, the first embodiment of the present invention comprises:

illuminating means having substantially parallel luminous fluxes and constituted by a laser diode 32 as being a coherent light source and a collimator lens 33;

a main scale 14 formed thereon with a first grating 16 wherein the ratio between a light transmitting portion 16A and a light shielding portion 16B is set at substantially 1:1 and a grating pitch is set at P;

an index scale 18 formed thereon with two-divided second grating 20 shifted in phase through 90° from each other, wherein the ratio between a light transmitting portion and light shielding portion is set at substantially 1:1 and a grating pitch is set at q;

two photodiodes 22 provided corresponding to the divided provision of the second grating 20, for photoelectrically transducing illuminating light transmitted through the first grating 16 and the second grating 20; and two preamplifiers 24 for amplifying outputs from the photodiodes 22, respectively, and outputting detection signals A and B set at a pitch t and shifted in phase through 90° from each other.

The wavelength λ of the laser diode 32 is set at about 0.8 micrometer. Here, λ is the wavelength of the laser diode 32, however, in general, λ may be made to be a center wavelength of effective spectra of an optical system in consideration of the light receiving element (photodiode 22).

When the laser diode 32 is installed at a far-away position, the collimator lens 33 may be dispensed with.

As the pitch P of the first grating 16, any one of 8 micrometer, 16 micrometer, 20 micrometer and 40 micrometer for example may be selected.

Furthermore, as the pitch q of the second grating 20, any one of 8 micrometer and 4 micrometer for example may be selected.

The present invention was evaluated by use of the first embodiment. Combinations of the pitch P of the first grating 16 with the pitch q of the second grating 20, which were used in the evaluation will be shown in the following Table 1. The value of t shown in Table 1 is a pitch of a detection signal obtained when the gap v between the first and second gratings is made larger than $P^2/\lambda$.

TABLE 1

| p (micrometer) | q (micrometer) | n | t (micrometer) |
|---|---|---|---|
| 40 | 8 | 5 | 8 |
| 20 | 4 | 5 | 4 |
| 16 | 8 | 2 | 8 |
| 16 | 4 | 4 | 4 |
| 8 | 4 | 2 | 4 |

As apparent from Table 1, it is found that, against the pitch P of the first grating 16, the pitch t of the detection signal is made small, whereby the optical multiple division is performed. The value n described in Table 1 shows P/t, i.e., the number of the optical division.

Here, even if the optical multiple division is made, it is conceivable that the manufacture of the second grating is difficult because the pitch q of the second grating 20 is equal to the pitch t of the detection signal. However, for the second grating 20, differing from the first grating 16 on the main scale 14 which requires the length covering the total length of measuring range, it suffices to have the length only covering the width of the light receiving elements. Accordingly, for example, a pattern may be directly formed by an eletronic beam drawing device, so that the second grating can be easily manufactured as compared with the first grating on the main scale.

Figure 3:
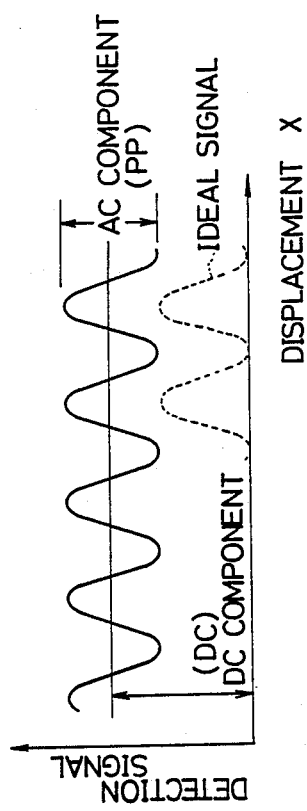
FIG. 3 is a chart in explanation of the contrast of signal of a detection signal.

Subsequently, evaluation was made on changes in the grating gap v and the states of the detection signals. FIG. 3 shows one example of the detection signals obtainable from the preamplifier 24. The degree of good quality of the detection signal can be evaluated in accordance with the contrast of signal defined in the following equation (12) by use of a DC component DC and an AC component PP.

$$\text{SIGNAL CONTRAST} = PP/DC \qquad (12)$$

More specifically, in general, the DC component DC, not contributing to the displacement detection, should be small in value. Hence, the larger the contrast of signal is, the stabler the measuring can be performed. The best contrast of signal obtained is indicated by broken lines in FIG. 3. From the definition of the contrast of signals, it is found that the value of the contrast of signals, at that time is 2.

As the grating gap v is varied, the contrast of signal is varied as well. FIGS. 4 (A) and (B) show the result of evaluation thereof. As the result of evaluation, depending on the number of the optical division, i.e., when n is 2 or n is other than 2, different tendencies are observed, so that FIG. 4 (A) shows the case of n=2, while FIG. 4(B) shows the case of n≠2.

Figure 4A:
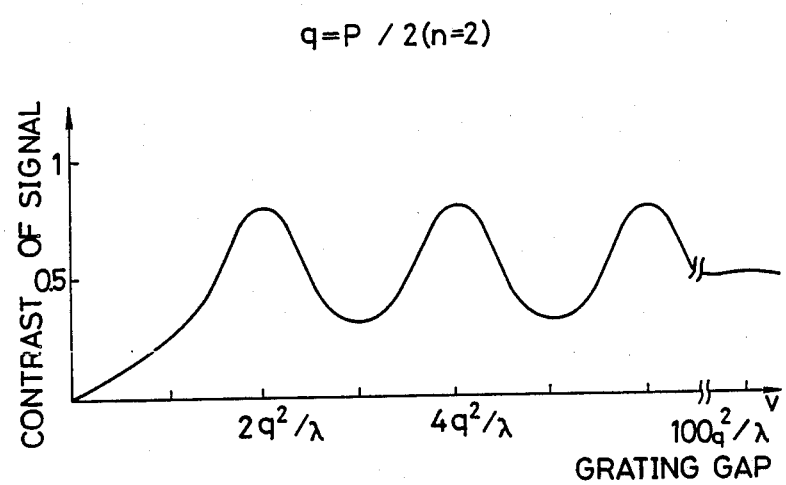
FIGS. 4(A) and 4(B) are charts showing the results of evaluation of the present invention by use of the first embodiment.

When n=2, as apparent from FIG. 4(A), peaks of the contrast of signal are present at positions where the grating gap v is obtained by multiplying $q^2/\lambda$ by an even number. Since zero is present nowhere, displacement can be detected as far as the grating gap v is $2q^2/\lambda$ or more. Further, what is most characteristic is that, when the grating gap v becomes about 100 $q^2/\lambda$ or more, the contrast of signal becomes substantially a constant value 0.5. Accordingly, it is found that, against the variation of the grating gap v, the detection signal hardly changes, thus enabling to construct a very stable detecting device.

Figure 4B:
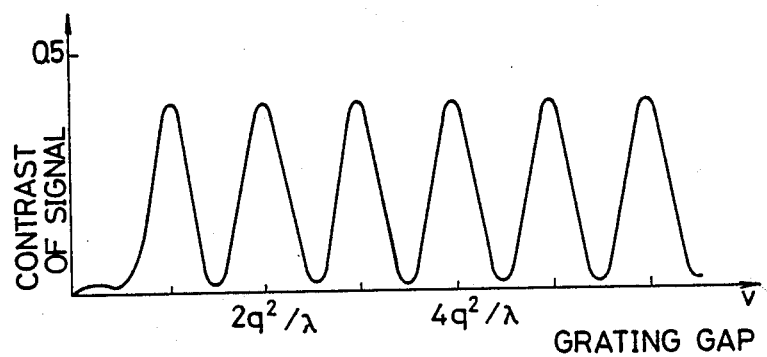

In contrast thereto, when n is not 2, such for example as a combination where the grating pitch P of the first grating 16 is 40 micrometer, while, the grating pitch q of the second grating 20 is 8 micrometer (n=5), the preaks of the contrast of signal are present close to positions where the grating gap v is obtained by multiplying $q^2/\lambda$ by a whole number as shown in FIG. 4(B), and the contrast of signal is nearly zero in each of the intermediate portions thereof. Consequently, it is found that, by setting the grating gap v at about $mq^2/\lambda$ (m is a positive whole number) and making the value of m large, even if the grating gap v is larger than a predetermined value, a detecting device, wherein the contrast of the detection signal is good, can be constructed.

incidentally, when the present invention was evaluated by use of the detecting device according to this first embodiment, the number n of division was 2–5. However, it is expectable that, in the case of higher multiple division, this may be applied similarly.

Figure 5:
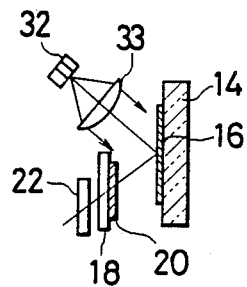
FIG. 5 is a sectional view showing the arrangement of a second embodiment of the present invention.

In The first embodiment, the present invention has been applied to a transmission type rectilinear displacement detecting device. However, the scope of application of the present invention need not necessarily be limited to this, and the present invention is similarly applicable to a reflection type rectilinear displacement detecting device as in the second embodiment shown in FIG. 5. In this case, as the main scale 14, a stainless steel tape or the like may be used in addition to the glass scale. Furthermore, the present invention is similarly applicable to a rotary displacement detecting device (rotary encoder) in addition to the rectilinear displacement detecting device (linear encoder).

In the above embodiment, as the coherent light source, the laser diode 32 has been used. However, the type of the light source need not necessarily be limited to this, and an emission diode having a width of emission spectra is about 20 nm or less may be used for example, in addition to the laser diode. Furthermore, even if the light emitting elements have the emission spectra of a wide width, by additionally using an interference filter or the like to select the wavelength, the light emitting elements can be used as a coherent light source.

The embodiment of the second aspect of the present invention will hereunder be described in detail.

Figure 6:
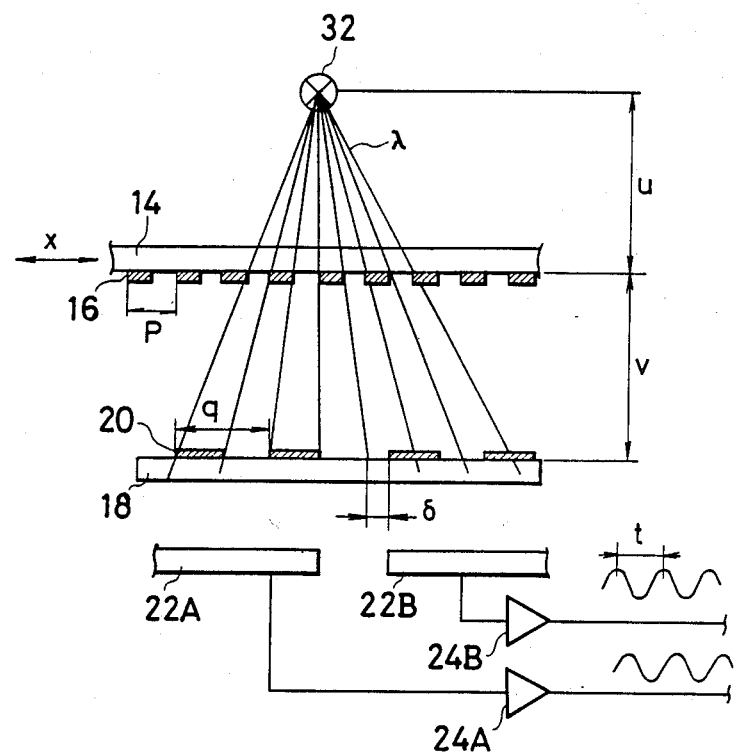
FIG. 6 is a sectional view in explanation of the arrangement of a third embodiment of the present invention.

The third embodiment of the present invention uses relationships described in the aforesaid formulae (5) and (6) and, as shown in FIG. 6, comprises:

a laser diode 32 for illuminating a main scale 14 without using a collimator lens;

the main scale 14 formed thereon with a first grating 16 having a grating pitch P, the grating 16 consisting of longitudinal fringe graduations, and located at a position spaced apart a gap u from the laser diode 32;

an index scale 18 formed thereon with a second grating 20 having a pitch q and located at a position spaced apart a gap v from the first grating 16;

two light receiving elements 22A and 22B shifted in phase from 0° to 90°, for photoelectrically transducing a change in quantity of light due to overlapping of an image of the first grating 16 by the laser diode 32 and the second grating 20 when the both scales 14 and 18 move relative to each other; and preamplifiers 24A and 24B for amplifying outputs from the light receiving elements 22A and 22B, respectively.

As the laser diode 32, such a laser diode may be used that the size of a light emitting portion thereof is about several micrometer square and a wavelength λ is about 0.78 micrometer (for example, HL-7801E of HITACHI, LTD.).

The gap v between the first grating 16 and the second grating 20 and the grating pitch q of the second grating 20 are adapted to satisfy relationships shown in the following formulae.

$$v \simeq unP^2/(\lambda u - nP^2) \qquad (13)$$

$$q = (u + v) P/u \qquad (14)$$

where n is a natural number of $\lambda n/P^2$ or less.

Specifically, when n=30 and both u and v are set at about 4.9 mm and the grating pitch P of the first grating is set at 8 micrometer, the grating pitch q of the second grating 20 may be 16 micrometer from the relationship shown in the equation (14). Finally, the positions of the laser diode 32 and the index scale 18 should be finely adjusted to obtain satisfactory signals. Furthermore, the allowable value of variations of the gap v is about plus or minus $0.1P^2/\lambda$.

On the other hand, as for the deviation δ of the second grating 20 divided by the deviation δ to obtain the signals shifted in phase, in order to obtain 90° plus or minus 10° as a phase difference the deviation δ may be (4 plus or minus 0.4) micrometer, because the grating pitch q is 16 micrometer Consequently, it is found that, in the second grating 20, both the grating pitch and the deviation are doubled in value as compared with the conventional detecting device, thus facilitating the manufacture of the second gratings.

Furthermore, the adverse influence of a shift between the pitch q of the second grating 20 and the pitch of the image, which is caused by variations in the gaps u and v when the main scale 14 is displaced can be avoided by reducing the width of the light receiving elements 22A and 22B in the direction of x.

In the arrangement of this embodiment, the main scale 14 is displaced in the direction of x, whereby detection signals having the pitch t=8 micrometer and shifted into two phases can be obtained from the preamplifiers 22A and 24B. In other words, t=P.

Figure 7:
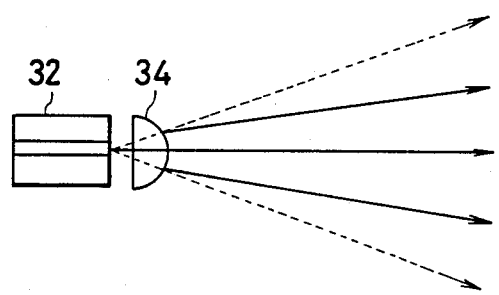
FIG. 7 is a sectional view in explanation of the arrangement of a fourth embodiment of the present invention.

In the third embodiment, the laser diode 32 as it is has been used as the point light source, however, the type of the point light source need not necessarily be limited to this, and, as in the fourth embodiment shown in FIG. 7 for example, a very small hemispherical lens 34 having a diameter of 500 micrometer, for controlling a diverging angle may be used in front of the light emitting portion of the laser diode 32. In this case, a diverging angle of the illuminating light from the laser diod 32 is controlled, so that the light receiving efficiency can be improved.

Further, as the point light source, a high output emission diode being in the intermediate form between the laser diode and an emission diode may be used.

The fifth embodiment of the present invention will hereunder be described in detail.

Figure 8:
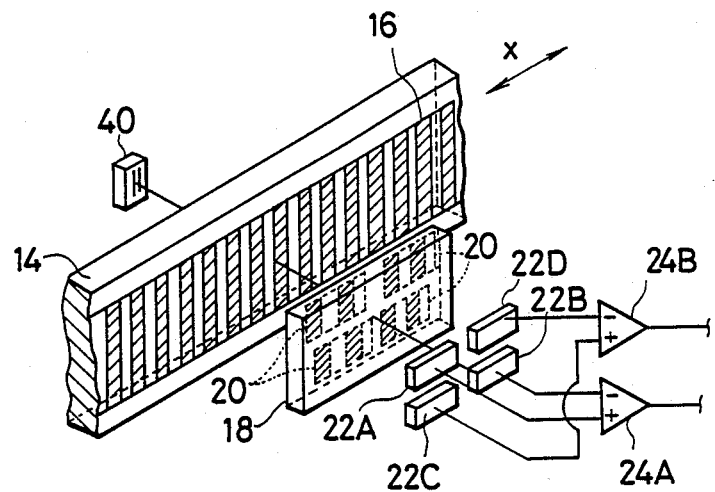
FIG. 8 is a perspective view in explanation of the arrangement of a fifth embodiment of the present invention.

As shown in FIG. 8, in this fifth embodiment, as the diffusive light source, there is used a linear light source 40 oriented in the direction of width of the first grating 16, such for example as a slit-shaped emission diode. Except that the four light receiving elements 22A, 22B, 22C and 22D are provided being shifted by the phases 0°, 180°, 90° and 270°, other respects are similar to those in the third embodiment, so that description will not be repeated.

When an ordinary emission diode is used as a light source, if a light emitting portion is merely made small in order to obtain a point light source, then emission output is reduced, whereby the amplification degree of the preamplifier must be increased, so that the S/N ratio is deteriorated. For this reason, in this fifth embodiment, the emission diode is used as the linear light source, not as the point light source.

Figure 9:
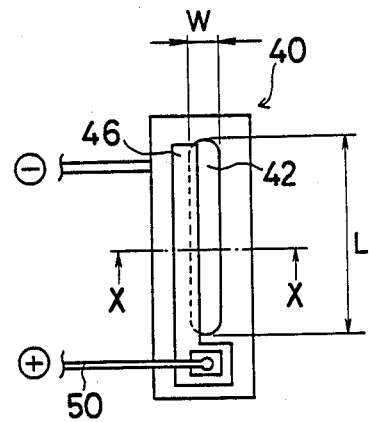
FIG. 9 is a front view in explanation of the arrangement of the linear light source used in the fifth embodiment of the present invention.
Figure 10:
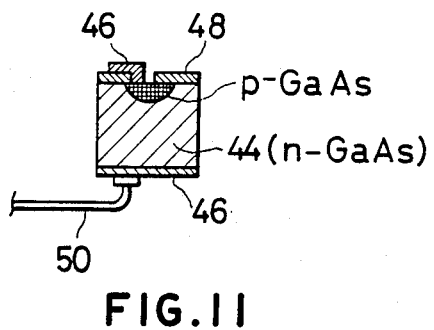
FIG. 10 is a cross-sectional view taken along the line X—X in FIG. 9.

As the linear light source 40, an emission diode having a slit-shaped light emitting portion 42 as shown in FIG. 9 and FIG. 10 may be used. This emission diode is of such an arrangement that a slit-shaped p-type GaAs having a width W of about 50 micrometer and a length L of about 400 micrometer is diffusively formed on a substrate 44 of n-type GaAs for example, and an electrode film 46 is deposited on the under-surface thereof and another electrode film 46 is deposited on the top surface thereof through an insulating film 48. Designated at 50 is a lead wire. The emission diode as described above emits light in a slit shape, whereby output is not reduced as a whole, so that the emission diode of this type is most suitable as the linear light source.

The longitudinal direction of the slit-shaped light emitting portion 42 of the emission diode is orientated in the direction of width of the first grating 16 of the main scale 14 as described above, whereby, even if the emission diode is a linear light source in the direction of grating width, it becomes a point light source in the x direction of grating, so that the emission diode can substantially function as the point light source.

The embodiment of the third aspect of the present invention will hereunder be described in detail.

Figure 11:
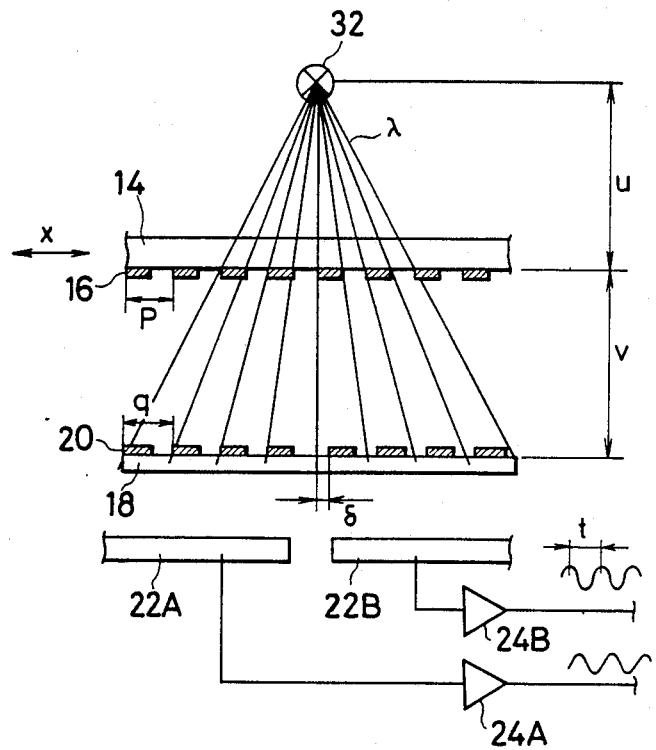
FIG. 11 is a sectional view in explanation of the arrangement of a sixth embodiment of the present invention.

The sixth embodiment of the present invention uses the relationships described in the aforesaid formulae (3) and (4) and, as shown in FIG. 11, comprises:

a laser diode 32 for illuminating a main scale 14 without using a collimator lens;

The main scale 14 formed thereon with a first grating 16 having a grating pitch P, the grating 16 consisting of longitudinal fringe graduations, and located at a position spaced apart a gap u from the laser diode 32;

an index scale 18 formed thereon with a second grating 20 having a pitch q and located at a position spaced apart a gap v from the first grating 16;

two light receiving elements 22A and 22B shifted in phase from 0° to 90°, for photelectrically transducing a change in quantity of light due to overlapping of an image of the first grating 16 by the laser diode 32 with the second grating 20 when the both scales 14 and 18 move relative to each other; and preamplifiers 24A and 24B for amplifying outputs from the light receiving elements 22A and 22B, respectively.

As the laser diode 32, the same one as in the third embodiment may be used.

the gap v between the first grating 16 and the second grating 20 and the grating pitch q of the second grating 20 are adapted to satisfy relationships in the following formulae.

$$v \simeq u (n - 0.5) P^2 /\{\lambda u - (n - 0.5)P^2\} \qquad (15)$$

-continued $$q = (u + v) P / (2u) \tag{16}$$

where n is a natural number of $\delta u/P^2 + 0.5$ or less.

Incidentally, as the result of experiments, it is found that the relationship shown in the formula (15) need not be maintained so strictly.

Specifically, when both u and v are set at about 5 mm and the grating pitch P of the first grating is set at 8 micrometer, the grating pitch q of the second grating 20 may be set at 8 micrometer as well, from the relationship shown in the equation (16).

On the other hand, as for the deviation δ of the second grating 20 divided by the deviation δ to obtain 90° plus or minus 10° as a phase difference, the deviation δ may be (2 plus or minus 0.2) micrometer, because the grating pitch q is 8 micrometer. Incidentally, when the moiré fringe method is adopted, δ is set at zero and the index scale may be finely rotated to arrange the light receiving elements 22A and 22B in the vertical direction.

Furthermore, the adverse influence of a shift between the pitch q of the second grating 20 and the pitch of the image, which is caused by variations in the gaps u and v when the main scale 14 is displaced can be avoided by reducing the width of the light receiving elements 22A and 22B in the direction of x. The above is similar to the third embodiment.

In the arrangement of this embodiment, even when the first grating 16 of the main scale 14 is displaced by one pitch P in the direction of x, the image obtained is varied by a value commensurate to two pitches. Consequently, detection signals having the pitch t = P/2 and shifted into two phases can be obtained from the preamplifiers 24A and 24B. In other words, the optical dividing into two is performed.

In the sixth embodiment, the laser diode as it is has been used as the point light source, however, the type of the point light source need not necessarily be limited to this, and, as the point light source, one obtained by providing a very small hemispherical lens 34 in front of a light emitting portion of the laser diode 32 as shown in the fourth embodiment illustrated in FIG. 7 or a high output emission diode may be used.

Further, as in the fifth embodiment shown in FIGS. 8 to 10, as the diffusive light source, the linear light source 40 orientated in the direction of width of the first grating 16 may be used.

The embodiment of the fourth aspect of the present invention will hereunder be described in detail.

Figure 12:
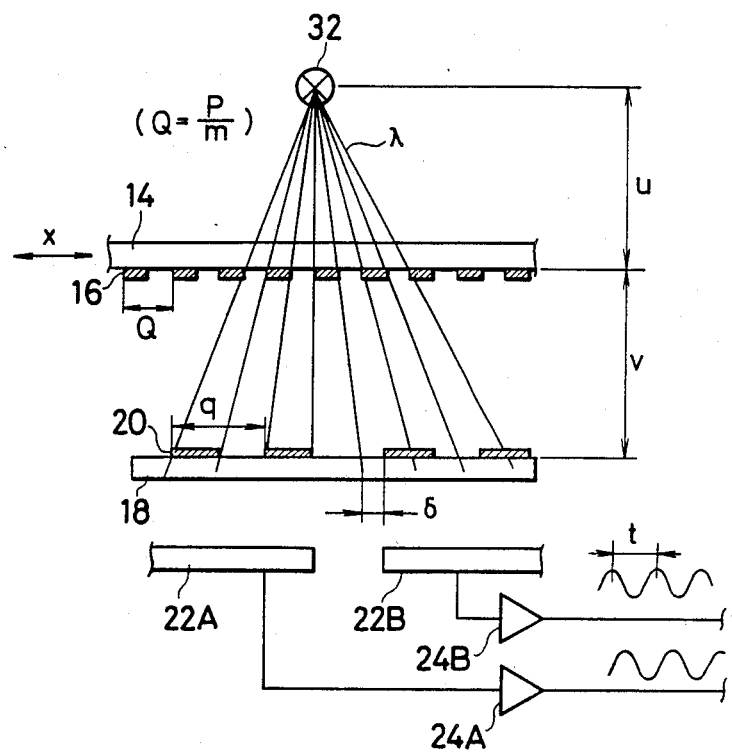
FIG. 12 is a sectional view in explanation of the arrangement of a seventh embodiment of the present invention.

The seventh embodiment of the present invention uses the relationships shown in the formulae (10) and (11), in which the higher harmonic components of the order of m are used, and, as shown in FIG. 12, comprises:

a laser diode 32 for illuminating a main scale 14 without using a collimator lens;

the main scale 14 formed thereon with a first grating 16 having a grating pitch P, the grating 16 including the higher harmonic components, and located at a position spaced apart a gap u from the laser diode 32;

an index scale 18 formed thereon with a second grating 20 having a pitch q and located at a position spaced apart a gap v from the first grating 16;

two light receiving elements 22A and 22B shifted in phase from 0° to 90°, for photoelectrically transducing a change in quantity of light due to overlapping of an image of the first grating 16 by the laser diode 32 with the second grating 20 when the both scales 14 and 18 move relative to each other; and preamplifiers 24A and 24B for amplifying outputs from the light receiving elements 22A and 22B, respectively.

Here, assumption is made that the first grating 16 has higher harmonic components of the order of m, and, in FIG. 12, the first grating is represented by a grating of pitch Q = P/m. As the first grating, a grating, wherein the ratio between the light transmitting portion and the light shielding portion is set at about 1:1, may be used for example.

As the laser diode 32, the same one used in the third embodiment may be used.

The gap v between the first grating 16 and the second grating 20 and the grating pitch q of the second grating 20 are adapted to satisfy relationships shown in the following formulae.

$$v \simeq nMQ^2 / \lambda \tag{17}$$

$$q = (u + v) Q/u \tag{18}$$

where n is a whole number of 1 or more.

Specifically, when m = 5, n = 120, both u and v are set at about 5 mm, and the grating pitch P of the first grating is set at 20 micrometer (Q = 4 micrometer), the grating pitch q of the second grating 20 may be 8 micrometer from the relationship shown in the equation (18). Finally, the positions of the laser diode 32 and the index scale 18 should be finely adjusted to obtain satisfactory signals. Furthermore, the allowable value of variations of the gap v is about plus or minus 0.2 $Q^2/\lambda$.

On the other hand, as for the deviation δ of the second grating 20 divided by the deviation δ to obtain the signals shifted in phase, inorder to obtain 90° plus or minus 10° as a phase difference, the deviation δ may be (2 plus or minus 0.2) micrometer, because the grating pitch q is 8 micrometer. Consequently, it is found that, in the second grating 20, both the grating pitch and the deviation are doubled in value as compared with the conventional detecting device, thus facilitating the manufacture of the second gratings.

Here, in the case of a vernier type detecting device, the grating pitch q of the second grating 20 is set at a value approximate to the one obtained by the equation (18), the division by phases of the grating pitch q is not necessary, and the grating pitch q may be doubled in value as compared with the conventional detecting device.

Furthermore, the adverse influence of a shift between the pitch q of the second grating 20 and the pitch of the image, which is caused by variations in the gaps u and v when the main scale 14 is displaced can be avoided by reducing the width of the light receiving elements 22A and 22B in the direction of x. The above is similar to the third embodiment.

In the arrangement of this embodiment, the main scale 14 is displaced in the direction of x, so that detection signals having pitch t = 4 micrometer and shifted two phases can be obtained from the preamplifiers 24A and 24B. In other words, t = Q. When these gratings are used, u = 5 mm and v ≃ 3 mm, the pitch of the detection signals becomes 5 micrometer from the magnification M = 8/5. In other words, the higher harmonic components of m = 4 are utilized.

In the seventh embodiment, the laser diode 32 as it is has been used as the point light source, however, the type of the point light source need not necessarily be limited to this, one obtained by providing a hemispherical lens 34 in front of a light emitting portion of the laser diode 32 as shown in the fourth embodiment illustrated in FIG. 7 may be used. In this case, a diverging angle of the illuminating light from the laser diode 32 is controlled, so that the light receiving efficiency can be improved. However, the value of u in the equation (18) should be converted to a value slightly larger than the actual gap.

Further, as the point light source, a high output emission diode or the like may be used.

Furthermore, as shown in the fifth embodiment illustrated in FIGS. 8 to 10, as the diffusive light source, the linear light source 40 orientated in the direction of width of the first grating 16 may be used.

In this case, a cylindrical lens for controlling a diverging angle may be provided in front of the linear light source.

Further, as the first grating, a grating having any shape may be used, only if it has the higher harmonic components.

The embodiment of the fifth aspect of the present invention will hereunder be described in detail.

Figure 13:
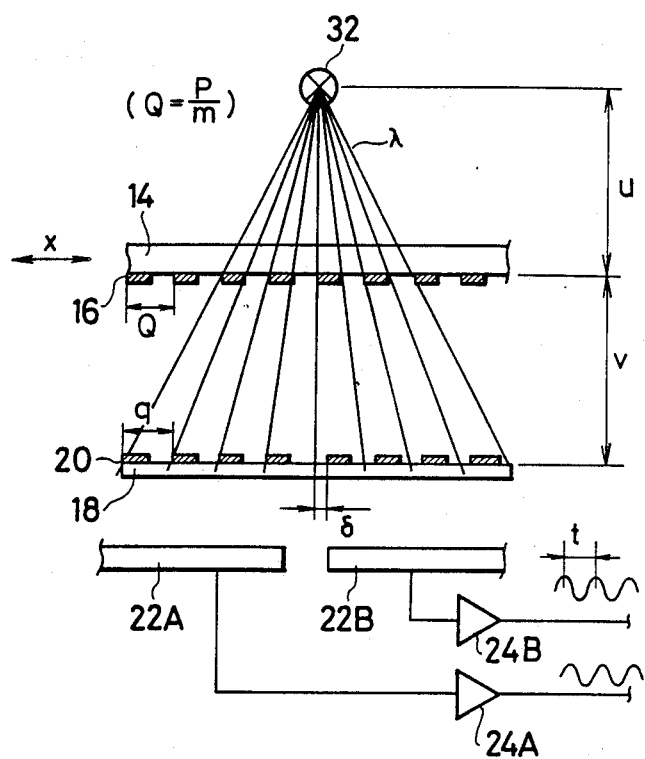
FIG. 13 is a sectional view in explanation of the arrangement of a eighth embodiment of the present invention.

The eight embodiment of the present invention uses the relationships shown in the formulae (8) and (9), in which the higher harmonic components of the order of m are used, and, as shown in FIG. 13 comprises:

a laser diode 32 for illuminating a main scale 14 without using a collimator lens;

the main scale 14 formed thereon with a first grating 16 having a grating pitch P, the grating 16 including the higher harmonic components, and located at a position spaced apart a gap u from the laser diode 32;

an index scale 18 formed thereon with a second grating 20 having a pitch q and located at a position spaced apart a gap v from the first grating 16;

two light receiving elements 22A and 22B shifted in phase from 0° to 90°, for photoelectrically transducing change in quantity of light due to overlapping of an image of the first grating 16 by the laser diode 32 with the second grating 20 when the both scales 14 and 16 move relative to each other; and preamplifiers 24A and 24B for amplifying outputs from the light receiving elements 22A and 22B, respectively.

Here, assumption is made that the first grating 16 has the higher harmonic components of the oder of m in the same manner as in the seventh embodiment, and the first grating is represented by a grating of pitch $Q=P/m$ in FIG. 13. As the first grating, a grating wherein the ratio of the light transmitting portion and the light shielding portion is about 1:1 for example may be used.

As the laser diode 32, the same one used in the third embodiment may be used.

The gap v between the first grating 16 and the second grating 20 and the grating pitch q of the second grating 20 are adapted to satisfy relationships shown in the following formulae.

$$v \simeq (n - 0.5)MQ^2/\lambda \quad (19)$$

$$q = (u + v)Q/(2u) \quad (20)$$

where n is a whole number of 1 or more.

However, the condition of the formula (19) is not so strict, as the result of experiments, it is found that the relationship need not be maintained so strictly.

Specifically, when m is set at 2, both u and v are set at about 5 mm and the grating pitch P of the first grating is set at 16 micrometer (Q=8 micrometer), the grating pitch q of the second grating 20 may be set at 8 micrometer similarly to Q from the relationship shown in the equation (20).

On the other hand, as for the deviation δ of the second grating 20 divided by the deviation δ to obtain 90° plus or minus 10° as a phase difference, the deviation δ may be (2 plus or minus 0.2) micrometer similarly to the seventh embodiment, because the grating pitch q is 8 micrometer. Incidentally, when the the vervier method is adopted, the grating pitch q of the second grating should be set at a value different from the value of the equation (20) and the light receiving elements 22A and 22B should be located at postions shifted in phase through 90° from each other.

Furthermore, the adverse influence of a shift between the pitch q of the second grating 20 and the pitch of the image, which is caused by variations in the gaps u and v when the main scale 14 is displaced can be avoided by reducing the width of the light receiving elements 22A and 22B in the direction of x. The above is similar to the third embodiment.

In the arrangement of this embodiment, when the first grating 16 of the main scale 14 is displaced by one pitch Q, i.e., P/m in the direction of x, the image obtained is varied by a value commensurate to two pitches. Consequently, detection signals having pitch $t=Q/2$ (pitch=4 micrometer in this case) and shifted into two phases can be obtained from the preamplifiers 24A and 24B. In other word, the optical dividing into four is performed.

In the eighth embodiment, the laser diode 32 as it is has been used as the point light source, however, the type of the point light source need not necessarily be limited to this, one obtained by providing a hemispherical lens 34 in front of a light emitting portion of the laser diode 32 may be used as in the fourth embodiment shown in FIG. 7. In this case, a diverging angle of the illuminating light from the laser diode 32 is controlled, so that the light receiving efficiency can be improved. However, the value of u in the equation (20) should be converted to a value slightly larger than the actual gap.

Further, as the point ligh source, a high output emission diode may be used.

Incidentally, when the same gratings as above are used, u is set at about 3 mm and v is set at about 6 mm, a magnification M in the optical system becomes 3 and the pitch of the detection signals becomes 8/3 micrometer.

Furthermore, as shown in the fifth embodiment illustrated in FIGS. 8 to 10, as the diffusive light source, the linear light source 40 orientated in the direction of width of the first grating 16 may be used.

In this case, in the above embodiment, a cylindrical lens for controlling a diverging angle may be provided in front of the linear light source.

Furthermore, as the first grating, a grating having any shape may be used, only if it has the higher harmonic components.

Figure 14:
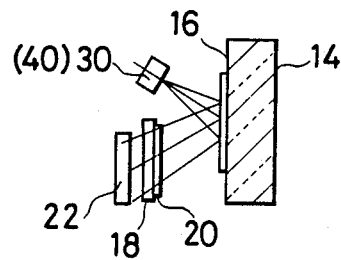
FIG. 14 is a sectional view in explanation of the arrangement of a ninth embodiment of the present invention.
Figure 15:
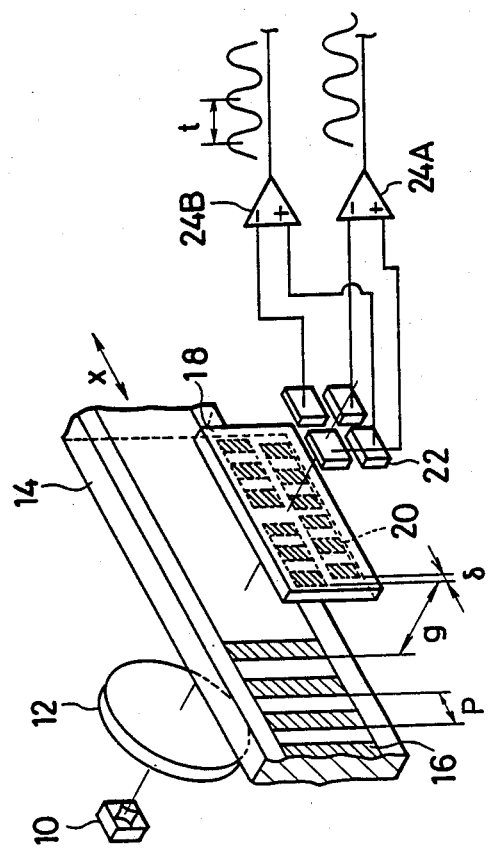
FIG. 15 is a perspective view showing the arrangement of one example of the conventional optical type displacement detecting device.
Figure 16:
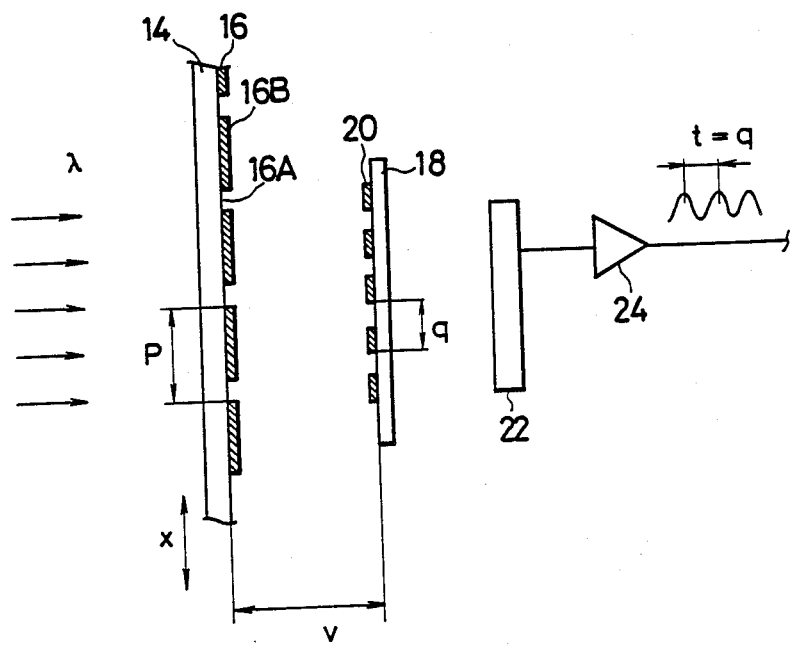
FIG. 16 is a sectional view showing the arrangement of another example of the conventional optical type displacement detecting device.

Incidentally, in the above embodiments, the present invention has been applied to the transmission type displacement detecting device, however, the scope of application of the present invention need not necessarily be limited to this, and, as shown in the ninth embodiment illustrated in FIG. 14, the present invention is applicable to a reflection type displacement detecting device as well.

Furthermore, in the above embodiments, the present invention has been applied to a rectilinear displacement detecting device wherein the second grating is provided dividedly into two or more, however, the scope of application of the present invention need not necessarily be limited to this, and the present invention is applicable to a moiré fringe type displacement detecting device not having divided second grating and a rotary displacement detecting device (rotary encoder) as well.

What is claimed is:

1. An optical type displacement detecting device comprising:
   illuminating means including a coherent light source;
   a main scale having formed thereon a first optical grating with a grating pitch P and the ratio between a light transmitting or reflecting portion and a light shielding or absorbing portion of said first optical grating being substantially 1:1;
   an index scale located at a position spaced apart by a gap $v \simeq mq^2/\lambda$ from said first grating and having formed thereon a second optical grating with a grating pitch $q = P/n$ and the ratio between a light transmitting portion and a light shielding portion of said second optical grating being substantially 1:1, and wherein m is a whole number of 1 or more, $\lambda$ is a wavelength at a mean value of the light sensitivity spectra of an optical system, and n in an odd number of 3 or more; and
   a light receiving element for photoelectrically transducing illuminating light transmitted through said first and second gratings;
   wherein a detection signal having a pitch P/n is produced in accordance with a relative displacement between said main scale and said index scale.

2. An optical type displacement detecting device comprising:
   a diffusive light source for illuminating a main scale without using a collimator lens;
   said main scale being located at a position spaced apart by a gap u from said diffusive light source and having formed thereon a first grating with a grating pitch P;
   an index scale located at a position spaced apart by a gap $$v \simeq u(n-0.5)P^2/\{\lambda u - (n-0.5)P^2\}$$

from said first grating and having formed thereon a second grating with a grating pitch $q = (u+v)P/(2u)$, and wherein n is a natural number $\leq (\lambda u/P^2 + 0.5)$, and $\lambda$ is a wavelength at a mean value of the light sensitivity specta of an optical system; and
   a light receiving element for photoelectrically transducing a change in quantity of light due to overlapping of an image of said first grating by said diffusive light source with said second grating when said main and index scales move relative to each other.

3. The optical type displacement detecting device as set forth in claim 2, wherein said diffusive light source is a point light source.

4. The optical type displacement detecting device as set forth in claim 3, wherein said point light source is a laser diode.

5. The optical type displacement detecting device as set forth in claim 3, wherein said point light source comprises a laser diode and a lens for controlling a diverging angle disposed in front of a light emitting portion of said laser diode.

6. The optical type displacement detecting device is set forth in claim 5, wherein said lens for controlling a diverging angle is a hemispherical lens.

7. The optical type displacement detecting device as set forth in claim 2, wherein said diffusive light source is a linear light source orientated in the direction of width of said first grating.

8. An optical type displacement detecting device comprising:
   a diffusive light source;
   a main scale located at a position spaced apart by a gap u from said diffusive light source and having formed thereon a first grating with a grating pitch P and including higher harmonic components;
   an index scale located at a position spaced apart by a gap v from said first grating and having formed thereon a second grating with a grating pitch $q \simeq (u+v) Q/u$, when $Q = P/m$, and wherein m is a whole number of 2 or more; and
   a light receiving element for photoelectrically transducing a change in quantity of light due to overlapping of an image of said first grating by said diffusive light source with said second grating when said main and index scales move relative to each other, to thereby produce a detection signal of the pitch P.

9. The optical type displacement dtecting device as set forth in claim 8, wherein said diffusive light source is a point light source.

10. The optical type displacement detecting device as set forth in claim 9, wherein said point light source is a laser diode.

11. The optical type displacement device as set forth in claim 9, wherein said point light source comprises a laser diode and a lens for controlling a diverging angle disposed in front of a light emitting portion of said laser diode.

12. The optical type displacement detecting device as set forth in claim 11, wherein said lens for controlling a diverging angle is a hemispherical lens.

13. The optical type displacement detecting device as set forth in claim 8, wherein said diffusive light source is a linear light source orientated in the direction of width of said first grating.

14. The optical type displacement detecting dcevice as set forth in claim 8, wherein said gap v is set at $$v \simeq nMQ^2/\lambda$$

wherein n is a whole number of 1 or more, when a wavelength at a mean value of the light sensitivity spectra of an optical system is set at $\lambda$ and a magnification M of said system is defined by $M = (u+v)/u$.

15. An optical type displacement detecting device comprising:
    a diffusive light source;
    a main scale located at a position spaced apart by a gap u from said diffusive light source and having formed therein a first grating with a grating pitch P and including higher harmonic components;
    an index scale located at a position spaced apart by a gap v from said first grating and having formed thereon a second grating with a grating pitch of $q \simeq (u+v)Q/(2u)$ when $Q = P/m$, wherein m is a whole number of 2 or more; and a light receiving element for photoelectrically transducing a change in quantity of light due to overlapping of an image of said first grating by said diffusive light source with said second grating when said main and index scales more relative to each other, to therby produce a detection signal of a pitch Q/2.

16. the optical type displacement detecting device as set forth in claim 15, wherein said diffusive light source is a point light source.

17. The optical type displacement detecting device as set forth in claim 16, wherein said point light source is a laser diode.

18. The optical type displacement detecting device as set forth in claim 15, wherein said point light source comprises a laser diode and a lens for controlling a diverging angle disposed in front of a light emitting portion of said laser diode.

19. The optical type displacement detecting device as set forth in claim 18, wherein said lens for controlling a diverging angle is a hemispherical lens.

20. The optical type displacement detecting device as set forth in claim 15, wherein said diffusive light source is a linear light source orientated in the direction of width of said first grating.

21. The optical type displacement device as set forth in claim 15, wherein said gap v is set at $$v \simeq (n - \tfrac{1}{2})MQ^2/\lambda$$

wherein n is a natural number of 1 or more, when a wavelength at a mean value of the light sensitivity spectra of an optical system is set at $\lambda$ and a magnification M of said system is defined by $M = (u+v)/u$.

22. An optical type displacement detecting device comprising:

illuminating means including a coherent light source;

a main scale having formed thereon a first optical grating with a grating pitch P and the ratio between a light transmitting or reflecting portion and a light shielding or absorbing portion being substantially 1:1;

an index scale located at a position spaced apart by a gap $v > 100q^2/\lambda$ from said first grating, wherein $\lambda$ is a wavelength at a mean value of the light sensitivity spectra of an optical system, and said index scale having formed thereon a second optical grating with a grating pitch $q = P/2$ and the ratio between a light transmitting portion and a light shielding portion being substantially 1:1; and a light receiving element for photoelectrically transducing illuminating light transmitted through said first and second gratings;

wherein a detection signal having a pitch P/2 is produced in accordance with a relative displacment between said main scale and said index scale.

* * * * *